United States Patent [19]

Jaeger et al.

[11] Patent Number: 4,807,952

[45] Date of Patent: Feb. 28, 1989

[54] VOLTAGE-INDUCED OPTICAL WAVEGUIDE MODULATOR HAVING REDUCED INTER-ELECTRODE GAP

[75] Inventors: Nicolas A. F. Jaeger, Richmond; Lawrence Young, Vancouver, both of Canada

[73] Assignee: The University of British Columbia, Vancouver, Canada

[21] Appl. No.: 922,011

[22] Filed: Oct. 22, 1986

[51] Int. Cl.$^4$ ................................................ G02B 5/14
[52] U.S. Cl. .................................................. 350/96.14
[58] Field of Search ................. 350/96.13, 96.14, 96.15

[56] References Cited

U.S. PATENT DOCUMENTS

| 3,795,433 | 3/1974 | Channin | 350/96 WG |
| 3,990,775 | 11/1976 | Kaminow et al. | 350/96.14 |
| 4,039,249 | 8/1977 | Kaminow et al. | 350/96.13 X |
| 4,111,523 | 9/1978 | Kaminow et al. | 350/96.14 |

OTHER PUBLICATIONS

"Electro-Optically Induced Optical Waveguide in KNbO$_3$", Baumert et al., in Entegrated Optics, Proceedings of the Third European Conference at pp. 44–48.
"Voltage-Induced Optical Waveguide", D. J. Channin in vol. 19, Appl. Phys. Lett., pp. 128–130.
"Fabrication of Flip-Chip Optical Couplers Between Single-Mode Fibres and LiNbO$_3$ Channel Waveguides", Bulmer et al., and Proceedings of the 31st Electronic Component Conference, pp. 109–113.
"Electrically Induced Ti:LiNbO$_3$ Strip-Waveguides: Effects of Electrooptic Modulation", Savatinova et al., Journal of Optical Communications, 5, (1984), pp. 10–15.

Primary Examiner—Gene Wan
Attorney, Agent, or Firm—Baker, Maxham & Jester

[57] ABSTRACT

A voltage-induced optical waveguide modulator is disclosed in which the inter-electrode gap is significantly reduced to a width on the order of 4 microns. The use of a dielectric layer between the electrodes and the electro-optic substrate is disclosed. A ridge of the electro-optic substrate between the electrodes is also disclosed. The dimensions of the device and operating voltage may consequently be signficantly reduced.

8 Claims, 2 Drawing Sheets

VOLTAGE-INDUCED OPTICAL WAVEGUIDE MODULATOR HAVING REDUCED INTER-ELECTRODE GAP

BACKGROUND OF THE INVENTION

The invention relates to the field of optical wave guides and more particularly to a voltage-induced optical waveguide modulator.

It is known to provide optical switching and modulating devices utilizing the properties of electrooptic crystals. As disclosed in an article by D. J. Channin entitled "Voltage-Induced Optical Waveguide", *Applied Physics Letters*, Vol. 19, No. 5, Sept. 1, 1971 at page 128, and in U.S. Pat. No. 3,795,433 entitled "Voltage-Induced Optical Waveguide Means" issued Mar. 5, 1974 to R.C.A Corporation, a voltage-induced optical waveguide may be constructed by depositing two parallel electrodes on the optically-polished surface of lithium niobate ($LiNbO_3$). A voltage differential applied to the electrodes produces a high electric field concentration in the crystal directly below the gap separating the electrodes. An optical waveguide is formed in the localized region of modified refractive index produced by the electric field through the electro-optic effect. Various means may be used for applying and extracting light energy to the waveguide region. By varying the voltage across the electrodes, the device can function as an optical switch or analog modulator.

Previous such voltage-induced optical waveguide devices have utilized, as described in the Channin article, a gap separating the electrodes of approximately seventy microns. It was thought that such a gap was necessary to avoid sparking between the electrodes. The problem with such a configuration is that a high turn-on voltage is required due to the distance between the electrodes, and there is increased uncertainty in the location of the output light spot or two separate output light spots may be created. Also, the optical throughput of the prior devices tends to be lower than optimal due to scattering of the light by the electrodes.

SUMMARY OF THE INVENTION

The present invention provides a voltage-induced optical waveguide modulator which is able to operate at reduced operating voltages and smaller dimensions, providing a faster modulator with higher optical throughput. The invention provides a voltage-induced optical waveguide modulator wherein the spacing between the parallel electrodes is less than 10 microns, and is preferably on the order of 4 microns. The reduced electrode gap allows reduction in the operating voltages and more precise coupling to the input and output light. The invention further provides for the use of a ridge of the electro-optical material between the electrodes which further reduces the operating voltages. The use of a low refractive index dielectric buffer layer between the electrodes and the electro-optical crystal is also provided. The reduction of the device's dimensions allows a reduced length and resultant improvement in optical throughput.

BRIEF DESCRIPTION OF THE DRAWINGS

In drawings which illustrate an embodiment of the invention.

DETAILED DESCRIPTION OF A PREFERRED EMBODIMENT OF THE INVENTION

Figure 1:
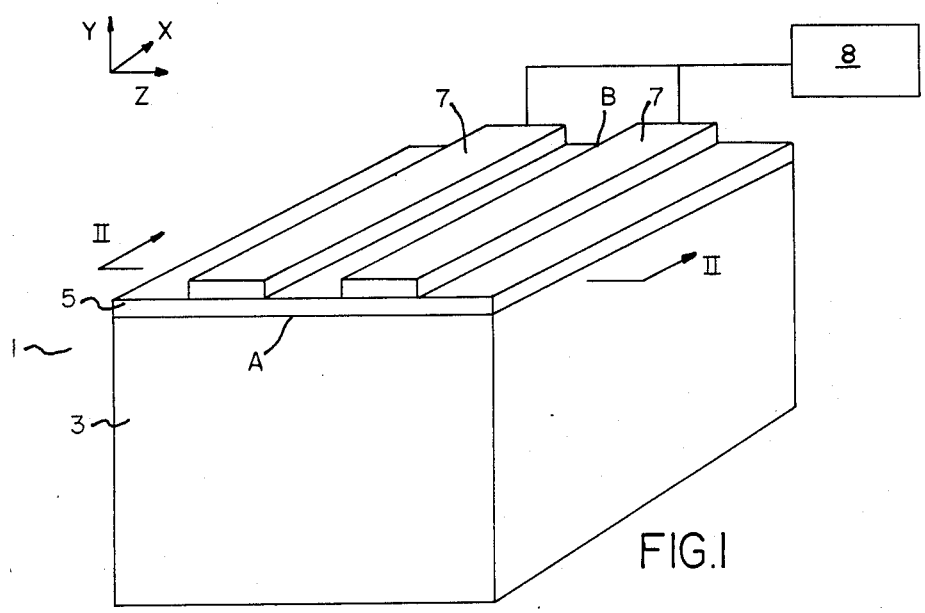
FIG. 1 is a perspective view of a first embodiment of the invention (not to scale)
Figure 2:
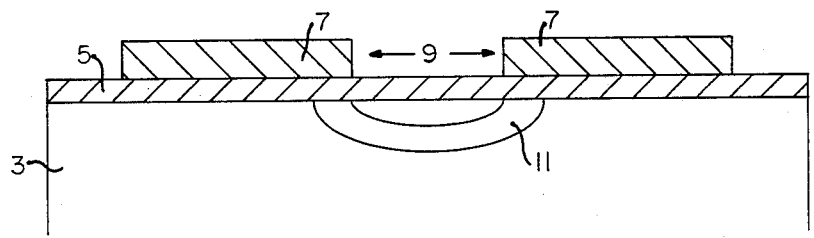
FIG. 2 is a cross-sectional view taken along lines II—II of FIG. 1 (not to scale)

Referring to FIGS. 1 and 2, the voltage-induced optical waveguide modulator of the invention is designated generally as 1. The electro-optic substrate used is a lithium niobate ($LiNbO_3$) crystal 3 which has been cut and polished so that its crystallographic Y-axis is perpendicular to the horizontal surface. That is, it is a Y-cut plate. Other electro-optical crystals with appropriate crystal orientations are suitable, such as lithium tantalate ($LiTaO_3$).

A dielectric buffer layer, such as silica ($SiO_2$), designated as 5, is sputtered onto the substrate 3. The electrode pattern is created on the buffer layer using lithography and chemical wet-etching, dry plasma etching or the lithographic technique known as lift-off, in a known fashion. The dielectric layer has a thickness of approximately 2,000 angstrom. $SiO_2$ is chosen as the buffer layer dielectric because it has a low refractive index relative to lithium niobate and also has good optical transmission. The thickness of the dielectric buffer layer may be reduced according to its refractive index.

Two parallel metal electrodes 7 are formed on the surface of the buffer layer, either by thermal evaporation or sputtering. Electrodes are formed of a conductive metal. In order to take advantage of the large electro-optic coefficient of lithium niobate, the electrodes are aligned so that the gap between them runs parallel to the X-axis of the crystal (or Y-axis if an X-cut crystal is used). A control voltage is applied across the electrodes by a source of control signals 8. The control signal may be either direct current or alternating current.

As shown in FIG. 2, the application of a voltage gradient between the electrodes creates an electric field 11 in the crystal 3 in the vicinity of gap 9. The strength of the field is highest closest to the interior edges of the electrodes.

As is known, if light wave energy is applied at point A and extracted at point B, due to the electro-optic properties of the crystal 3, the region of the crystal adjacent gap 9 will act as a waveguide, the light-guiding properties of which for a given voltage gradient between the electrodes 7 is a function of the refractive index and electro-optic coefficient of the crystal, the wavelength of the light and the width of the gap. By controlling the amplitude of the voltage applied across the electrodes in accordance with an analog signal, the waveguide can operate as an analog modulator.

While in the prior art the width of gap 9 has been on the order of seventy microns, in the present invention, the gap is greatly reduced to less than ten microns, and in the preferred embodiment is approximately four microns wide. Previously, the width of the gap was held at a greater level, it was believed, to prevent breakdown in the air gap between the electrodes with resultant sparking. However it has been found that the width of the gap can be reduced to an extent much greater than was previously thought while still allowing large applied voltages and without breakdown in the air gap.

The result is that while in the prior art a very large turn-on voltage, on the order of three hundred volts, was reported, in the present invention a much lower voltage is sufficient.

While a very low turn-on voltage is required given the small inter-electrode gap, larger voltages, on the order of 30 to 50 volts, are applied for practical applications. The reason for this is that the energy in the mode at the cut-off point is spread out and is barely distinguishable from a bulk mode. It is necessary to increase the voltage to obtain a suitable confinement. The coupling efficiency from the source depends on the lateral dimensions of the mode.

An advantage of the reduced inter-electrode gap is that the location of the optical mode pattern can be predicted much more accurately. This allows a better coupling to mono-mode optical fibers than in the prior art.

It has also been found that an improved theoretical model can be used for the device using small interelectrode gaps. This in turn allows more accurate theoretical prediction of the behavior of the device thus facilitating the design of a device which exhibits more efficient coupling of the output light to a mono-mode fiber.

The reduction in dimensions in the device also allows a reduction in the device's length. This in turn increases the optical throughput of the device. The use of the low refractive index dielectric buffer layer also increases the optical throughput, by reducing scattering.

The reduced dimensions and operating voltage, and improved optical throughput result in a device which can be used in optical switching systems capable of acting at higher speeds than the prior art devices. A useful application of the device has been found as a modulator in an imaging system which provides digital pre-press proofs before separation films are made. In particular, it has been found to be useful in the electronic pre-press systems such as the system sold under the trade mark FIRE 9000 by MacDonald Dettwiler Technologies, Ltd.

It has also been found that the use of a reversed voltage increases the extinction or on/off light ratio which is found to be particularly useful for the small dimensions in the present invention. In this technique, a reversed voltage is applied to the electrodes, decreasing the refractive index in the region between the electrodes and causing light to be refracted out of that region.

It has been found that the operating voltage can be further reduced by the addition of a strip of dielectric material having slightly higher refractive index than the substrate between the electrodes but which is too thin to act as an optical waveguide on its own without contribution from the substrate.

Figure 3:
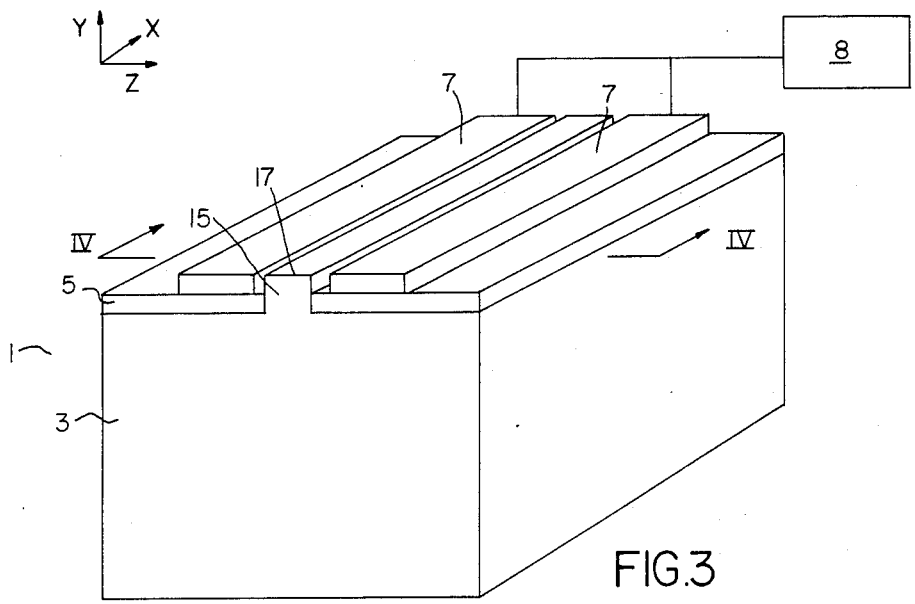
FIG. 3 is a perspective view of a second embodiment of the invention (not to scale)
Figure 4:
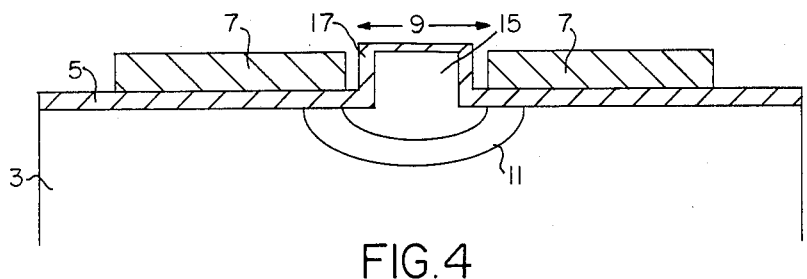
FIG. 4 is a cross-sectional view taken along lines IV—IV of FIG. 3 (not to scale).

A further embodiment of the invention is shown in FIGS. 3 and 4. In this embodiment, the operating voltage of the device can also be further reduced. In this embodiment, a ridge 15 of the substrate material is etched on the upper surface of the substrate crystal 3 so that the ridge is formed between the electrodes 7. The dimensions of the ridge will vary according to the application and the dimensions of the mode which is used. A width of the ridge on the order of four microns has been found to be useful. The ridge extends the length of the gap 9 between the electrodes. Again, the substrate is provided with a thin layer of dielectric buffer, which extends over the ridge also at 17. In this embodiment, the gap between the electrodes will be slightly greater than four microns.

As will be apparent to persons skilled in the art, various modifications and adaptations of the structure above-described are possible without departure from the spirit of the invention, the scope of which is defined in the appended claims.

We claim:

1. A voltage-induced optical waveguide modulator comprising:
   (a) a piece of electro-optical material which is substantially transparent to a given lightwave energy;
   (b) a layer of dielectric material disposed on said electro-optical material and having a low refractive index relative to the refractive index of said electro-optical material;
   (c) a pair of parallel, spaced electrodes disposed on said dielectric and arranged in side-by-side relationship in order to define a neighbouring region of said electro-optical material, whereby said region acts as a waveguide for said given lightwave energy in response to a suitable voltage being applied across said spaced electrodes, wherein said space between said electrodes is less than ten microns.

2. The voltage-induced optical waveguide modulator of claim 1 wherein said space between said electrodes is approximately four microns.

3. The voltage-induced optical waveguide modulator of claim 1 wherein said dielectric layer comprises silica.

4. The voltage-induced optical waveguide modulator of claim 3 wherein said electro-optical material is LiNbO$_3$.

5. The voltage-induced optical waveguide modulator of claim 1 wherein said electro-optic material comprises lithium niobate.

6. The voltage-induced optical waveguide modulator of claim 1 further comprising a strip of dielectric material situated between said electrodes, said strip of dielectric material being incapable of acting as a waveguide in the absence of said applied voltage.

7. The voltage-induced optical waveguide modulator of claim 1 further comprising a ridge of said electro-optical material running between and parallel to said electrodes.

8. The voltage-induced optical waveguide modulator of claim 6 wherein said electro-optical material is LiNbO$_3$.

* * * * *